W. Wheeler,
Dressing Stone.
Nº 8,618.   Patented Dec. 23, 1851.
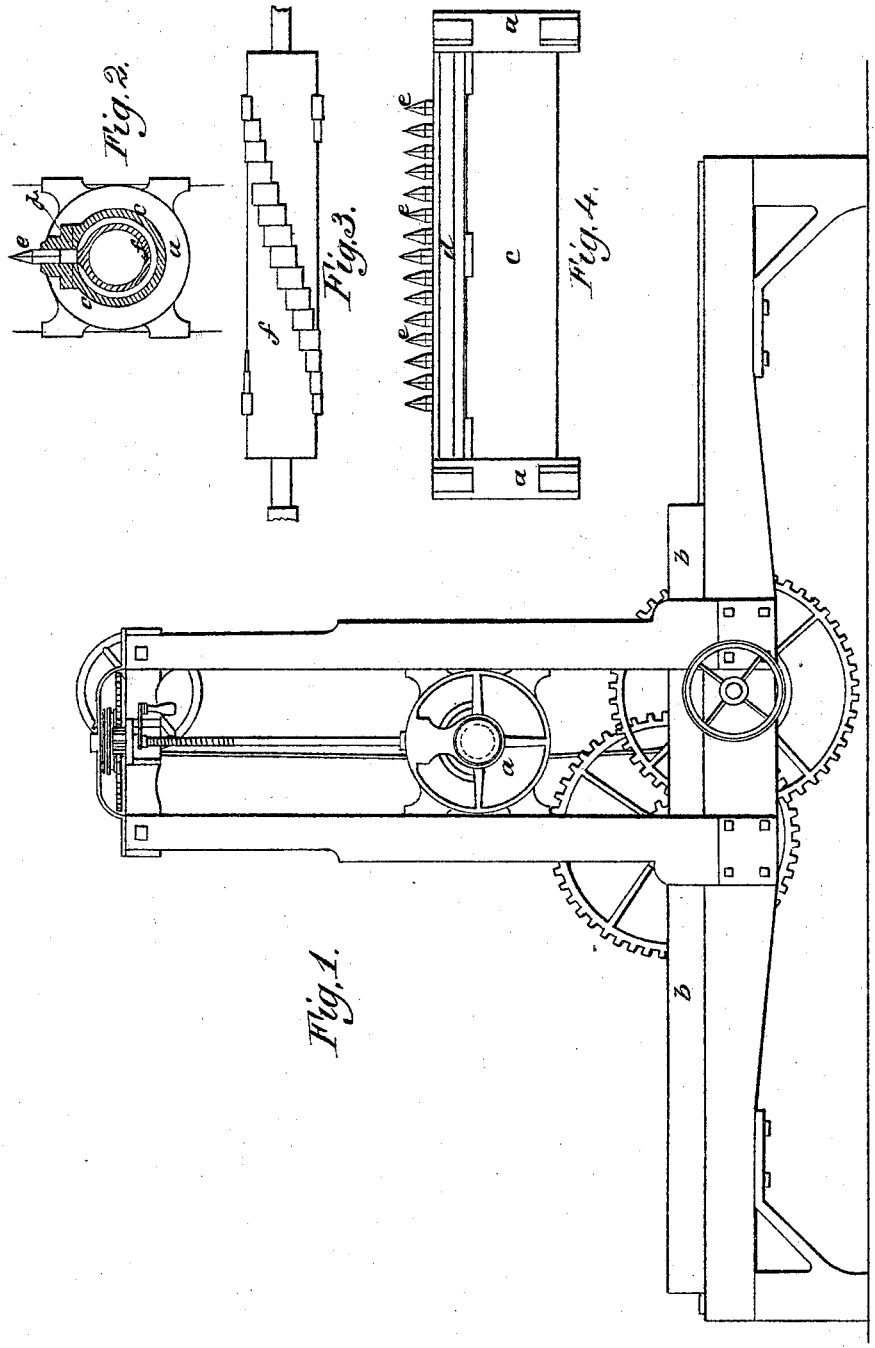

UNITED STATES PATENT OFFICE.

WILLIAM WHEELER, OF WEST POULTNEY, VERMONT.

MACHINE FOR DRESSING STONE.

Specification of Letters Patent No. 8,618, dated December 23, 1851.

*To all whom it may concern:*

Be it known that I, WM. WHEELER, of West Poultney, in the county of Rutland and State of Vermont, have invented certain new and useful Improvements in Stone-Cutting Machinery, and that the following is a full, clear, and exact description of the principle or character which distinguishes them from all other things before known and of the usual manner of making, modifying, and using the same.

My improvement consists in the cylindrical tool-holder, in which the cams revolve, that cause the tools to act upon the stone, the said cylinder acting as a support to the cams and shafts; and it also enables me to bring the tool on to the stone in any direction, cutting equally well when the carriage is moving forward or back, or while cutting over the top surface, or up and down the ends.

The construction is as follows: the frame carriage and its movements are old devices, similar to such as have been heretofore used; the checks or uprights in which the cams and cylinder tool-holder are supported have ways on them, between which a sliding box (*a*) works up and down perpendicular to the bed or carriage (*b*,) on each side of the frame; these boxes are raised and lowered by screws and nuts, and they are connected or geared together so as to cause the ends of the cylinder to rise or fall parallel. These boxes (*a*,) have circular recesses in their inner faces into which the ends of the cylindrical tool-holder (*c*) fits, is sustained and turns; they also support the journals of the cam shaft.

The cylinder tool-holder (*c*,) is made of cast iron or other suitable material, and along one side it has a long narrow opening from end to end, or to an extent sufficient to admit all the tools to be used in the operation of cutting the stone. On either side of the opening there is a stout flanch (*d*) bolted, the edges of which turn up at right angles, and meet over the opening, leaving a recess within and along the meeting edges of the flanches an opening to permit the tools (*e*) to project through. The tools are like the ordinary chisels in shape, or they may be of any other convenient form; and the shanks within the recess in the flanches are headed, to prevent their dropping out. One of these tools is shown in Figure 2; they may be made of cast iron or steel; the inside of the cylinder is turned smooth, and is made just as large as the outer circle described by the cams; the cam shaft (*f*) is made as stout as circumstances will allow, and around its periphery are two or more rows of cams, as clearly shown in Fig. 3; as these are revolved around within the cylinder, they force out the tools to cut the stone in contact therewith; the progress of the stone forward causes these tools to recede as in some other machines heretofore invented many years since.

The cylinder tool holder (*c*) can be turned by a lever attached to it, or in any other convenient way, and the position of the tools changed so as to cut in one direction or the reverse, or up or down as occasion shall require; and the tools can be made to assume any angle with regard to the work, that will be found best adapted to it, always maintaining the same relative position to the cams when pointed in any direction.

Having thus fully described my improvements in cutting stone by machinery, what I claim therein as new, and for which I desire to secure Letters Patent, is—

The cylindrical tool-holder, constructed and arranged substantially as herein set forth, so as to hold the tools or chisels and turn them in a direction to cut either way, keeping them in such position as always to receive the blows from the cams in the same relative direction and also incidentally to support the cam shaft by means of the cams resting against its interior should the cam shaft spring.

WILLIAM WHEELER.

Witnesses:
HENRY CLARK,
JNO. W. SMITH.